United States Patent
Sato

[11] Patent Number: 5,844,233
[45] Date of Patent: *Dec. 1, 1998

[54] COLOR IMAGE READING APPARATUS HAVING DICHROIC MIRROR AND BLAZED DIFFRACTION GRATING

[75] Inventor: Hiroshi Sato, Kawasaki, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 596,623

[22] Filed: Feb. 5, 1996

[30] Foreign Application Priority Data

Feb. 9, 1995 [JP] Japan ................................ 7-044747

[51] Int. Cl.$^6$ ................................................ H01J 40/14
[52] U.S. Cl. .................... 250/208.1; 250/226; 359/571; 358/515
[58] Field of Search ............................... 250/208.1, 226, 250/234, 237 G; 359/15–17, 22, 563, 564, 569–575, 571; 358/512–514, 515; 348/336, 635, 642

[56] References Cited

U.S. PATENT DOCUMENTS

| | | | |
|---|---|---|---|
| 5,113,067 | 5/1992 | Nakai et al. | 250/208.1 |
| 5,471,321 | 11/1995 | Setani | 358/514 |
| 5,481,383 | 1/1996 | Morishima et al. | 250/226 |

FOREIGN PATENT DOCUMENTS

| | | |
|---|---|---|
| 0240000 | 10/1987 | European Pat. Off. . |
| 0415363 | 3/1991 | European Pat. Off. . |
| 0457281 | 11/1991 | European Pat. Off. . |

*Primary Examiner*—Que Le
*Attorney, Agent, or Firm*—Fitzpatrick, Cella, Harper & Scinto

[57] ABSTRACT

A color image reading apparatus includes a light-receiving unit in which a plurality of line sensors are disposed at equal intervals on a same substrate, an imaging optical system for imaging an object on the light-receiving unit, a blazed diffraction grating, disposed in an optical path between the imaging optical system and the light-receiving unit, for color-separating light from the object into a plurality of color light beams, and a dichroic mirror disposed in an optical path between the blazed diffraction grating and the light-receiving unit, and having at least two reflecting surfaces.

9 Claims, 9 Drawing Sheets

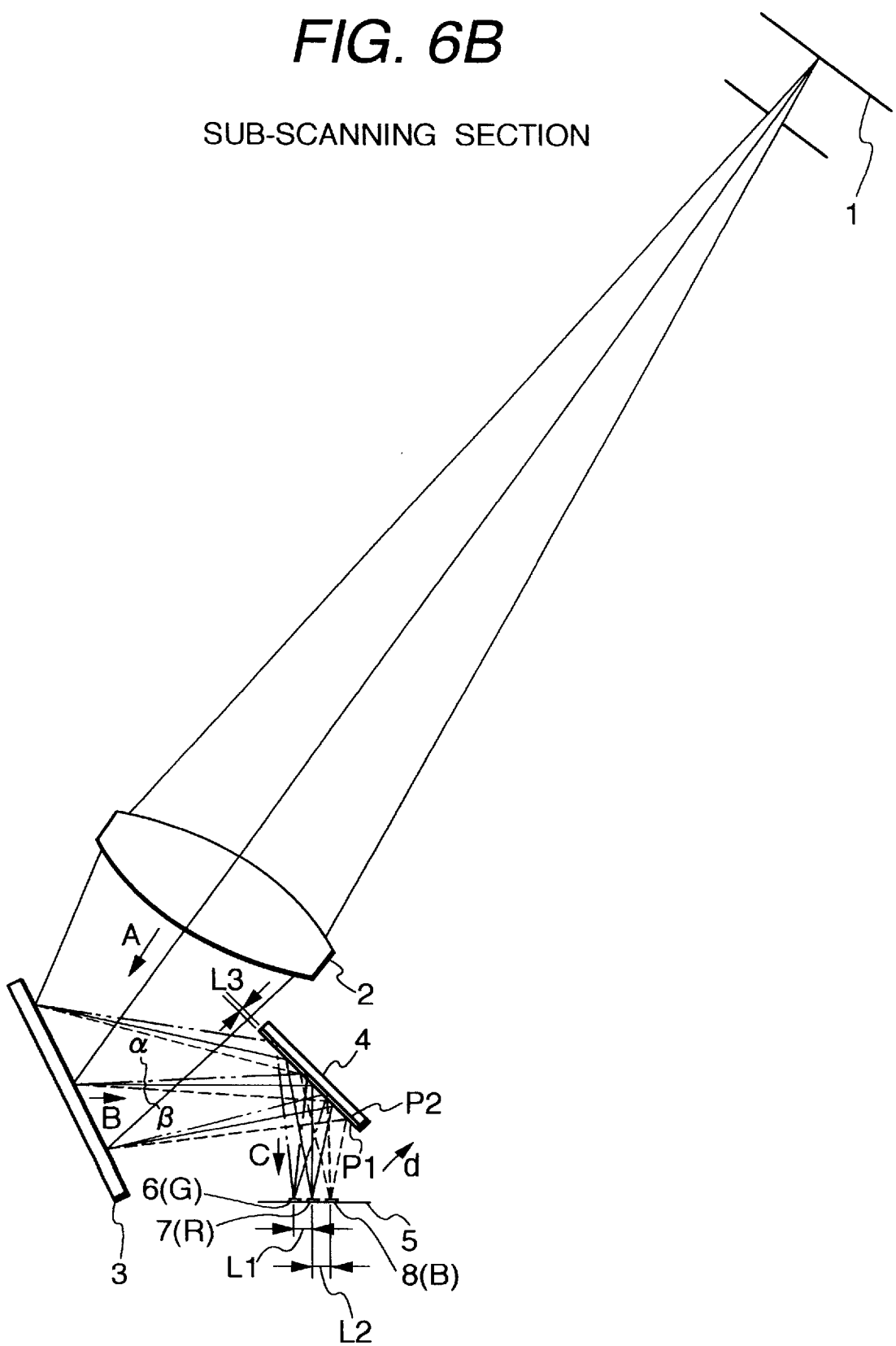

SUB-SCANNING SECTION

SUB-SCANNING SECTION

COLOR IMAGE READING APPARATUS HAVING DICHROIC MIRROR AND BLAZED DIFFRACTION GRATING

BACKGROUND OF THE INVENTION

1. Field of the Invention

The present invention relates to a color image reading apparatus, and more specifically, to a color image reading apparatus suitably applicable for example to color scanners, color facsimile devices, etc., which can read color image information on a surface of an original with high accuracy by utilizing a color separating means comprised of a one-dimensional blazed diffraction grating, a light-receiving means with three line sensors (solid state image sensing devices) formed on a same substrate surface, and a dichroic mirror having at least two reflecting surfaces.

2. Related Background Art

There are various proposals heretofore made as to apparatus for digitally reading color image information by line-scanning a color image on the original surface in the sub-scanning direction, focusing the image information through an optical system on surfaces of line sensors such as CCDs, and utilizing output signals from the line sensors at this time.

FIG. 1 is a schematic drawing to show the major part of the optical system in a conventional color image reading apparatus. In the drawing, when an imaging lens 29 condenses a light beam from the color image on the original surface 10 to form an image thereof on the line sensor surfaces, the light beam is color-separated into three colors, for example red (R), green (G), and blue (B), through a 3P (three-piece) prism 20 and thereafter the three color beams are guided onto the surfaces of the corresponding line sensors 21, 22, 23. Each color image formed on the surface of each line sensor 21, 22, 23 is line-scanned in the sub-scanning direction to read information of each color light.

The color image reading apparatus shown in FIG. 1, however, required the three independent line sensors, demanded high accuracy, and needed the 3P prism, which is not easy to produce. Thus, the entire apparatus became complicated and expensive. Further, the apparatus needed three independent alignments between an imaging beam and each line sensor, resulting in a problem of troublesome assembling adjustment or the like.

There is thus another color image reading apparatus conventionally proposed in such an arrangement that the color image is read utilizing a monolithic 3-line sensor in which three line sensors (CCDs) are arranged in parallel with each other and a finite distance apart from each other on a same substrate surface.

This monolithic 3-line sensor is shown in FIG. 2. As shown in FIG. 2, the monolithic 3-line sensor 24 includes three line sensors (CCDs) 25, 26, 27 arranged in parallel with each other and a finite distance apart from each other on the same substrate surface, and has unrepresented color filters, selected based on the respective color light beams, on the surfaces of the line sensors 25, 26, 27.

Further, the separations (distances) S1, S2 in the sub-scanning direction between the line sensors 25, 26, 27 are determined generally to be for example about 0.1 to 0.2 mm in view of various fabricating conditions, and pixel widths W1, W2 of each single pixel 28 are set for example to about 7 μm×7 μm to about 10 μm×10 μm.

FIG. 3 shows a conventional color image reading apparatus using the above monolithic 3-line sensor as a light-receiving device (reading device).

In FIG. 3, the color image on the original surface 10 is line-scanned in the sub-scanning direction. Before reading the color image information by the monolithic 3-line sensor 24, a light beam from the color image is separated into three color light (light beams) corresponding to the three colors by two color-separating beam splitters 30, 31, each provided with a wavelength-selective transmission film having dichroism, through the imaging lens 29. Thereafter color images corresponding to the three color light are focused on the surfaces of the corresponding line sensors in the monolithic 3-line sensor 24.

The color-separating system using a plurality of beam splitters as described above, however, had the following problems: the system was greatly affected by the positional accuracy, face accuracy, etc. of the respective beam splitters, which interfered an increase of accuracy of system; further, the color-separating system needed to be constructed only of dichroic filters, which decreased freedom degrees on spectral characteristics.

On the other hand, the line-to-line distances S1, S2 of the two lines 25, 27 with respect to the center line 26 in the monolithic 3-line sensor 24 are generally set to be equal to each other in a direction perpendicular to the lines and to be an integral multiple of the pixel size W2 (see FIG. 2) in the sub-scanning direction. This is from the following reason.

Namely, when the color image is read by the monolithic 3-line sensor 24 as described above, using only the ordinary imaging optical system 29, as shown in FIG. 4, read positions on the original surface 10 that can be read simultaneously by the three line sensors 25, 26, 27 are three different positions 25', 26', 27' as shown in FIG. 4.

Because of it, signal components of three colors (R, G, B) cannot be read simultaneously for an arbitrary position on the original surface 10, and they need to be aligned and combined after read by the monolithic 3-line sensor 24.

To achieve it, the distances S1, S2 between the lines in the monolithic 3-line sensor 24 are set to be an integral multiple of each pixel size W2. Redundant line memories corresponding thereto are prepared, for example, the G, R signals (signal components based on the G color light and R color light) are delayed relative to the B signal (signal component based on the B color light), thereby relatively easily obtaining a combined signal component of the three colors.

Therefore, the distances S1, S2 of the two line sensors 25, 27 relative to the center line sensor 26 in the monolithic 3-line sensor 24 are set to be an integral multiple of the pixel size W2 in the sub-scanning direction, as described above.

The color image reading apparatus as described above, however, had the following problems: the apparatus needed to have plural arrays of expensive line memories in order to match the redundant line memories with the line-to-line distances of the monolithic 3-line sensor, which was extremely disadvantageous in respect of cost and which made the entire apparatus complex.

Another color image reading apparatus heretofore proposed is the one as disclosed in U.S. Pat. No. 5,223,703, in which a one-dimensional blazed diffraction grating is used as an optical element for color separation in combination with the monolithic 3-line sensor and in which color image information color-separated by the diffraction grating is made incident into the monolithic 3-line sensor, thereby detecting the color image information.

FIGS. 5A and 5B are drawings to show the color image reading apparatus as disclosed in U.S. Pat. No. 5,223,703. FIGS. 5A and 5B show the sub-scanning section perpendicular to the main-scanning section. In FIGS. 5A and 5B, image information on the original surface 101, which is an object, is line-scanned in the sub-scanning direction (in the vertical direction on the plane of FIG. 5A) by a mirror (not shown) etc. disposed between the original surface and the imaging optical system 102, and then the light of image information is guided through the imaging optical system 102 to a reflection type one-dimensional blazed diffraction grating 103 for separation into the three colors.

Here, the information light from a same position (a same line) on the original surface 101 is separated by reflective diffraction in the vertical direction in the drawing into three beams 105, 106, 107 of the three colors (for example, R, G, and B) in so-called color reading, and then they are focused on corresponding sensor arrays or line sensors 108, 109, 110 on the monolithic 3-line sensor 104.

Then the image information on the original surface 101 is successively read by relatively moving the original surface 101 to the image reading apparatus (imaging optical system 102, diffraction grating 103, and sensor 104) in the sub-scanning direction.

Here, the sensor arrays 108, 109, 110 on the sensor 104 extend in the main-scanning direction perpendicular to the plane of the drawing. The sensor 104 is a monolithic 3-line sensor in which three lines of one-dimensional sensor arrays are arranged at intervals of finite distances in the perpendicular direction (the sub-scanning direction) to the direction of the arrays and on a same substrate.

The one-dimensional blazed diffraction grating 103 is disposed in the optical path between the imaging optical system 102 and the sensor 104 and on the side of the sensor 104 with respect to the exit pupil of the imaging optical system 102, and is provided for color-separating the light from the object into plural beams and guiding the beams of color-separated light to the sensor arrays each associated therewith.

The original surface 101 is illuminated by an illumination light source not shown, and the image information thereon is read by the image reading apparatus.

The above one-dimensional blazed diffraction grating for separation into the three colors is described in Applied Optics, vol. 17, No. 15, pp 2273–2279 (Aug. 1st, 1978), and the configuration thereof is shown in FIG. 5B, which is an enlarged drawing to show relations in the sub-scanning section.

Incidentally, the reflection type one-dimensional blazed diffraction grating 103 shown in FIG. 5B separates the light by reflection diffraction into the beams including ± first-order diffracted light 107, 105 and zeroth-order light 106, and distances 116, 115 between the images of the zeroth order light 106 and the ± first-order diffracted light 107, 105, respectively, separately formed on the sensor surface 104 can be expressed as Z by the following equation, using the symbols in FIG. 5B.

$$Z = l \times \tan\{\sin^{-1}(\pm \lambda/p + \sin \theta_0) - \theta_0\} \quad (1)$$

(In the equation, $\lambda$ is the wavelength of the information light separately focused, $\theta_0$ an angle of incidence to the blazed diffraction grating 103, p the grating pitch, and l a distance on the optical axis between the grating and the light-receiving surface.)

For example, in the case of the step shape of the reflection type blazed diffraction grating 103, supposing the depth $h_1$ of the first step and the depth $h_2$ of the second step are determined as $h_1$=909 nm and $h_2$=1818 nm, respectively, the center wavelength of the zeroth-order light is $\lambda_0$=525 nm, that of the + first-order diffracted light is $\lambda_{+1}$=592 nm, and that of the —first-order diffracted light is $\lambda_{-1}$=472 nm. This is based on the following equation.

$$\lambda = 2h_1 \cdot \cos \theta_0 / m = 2h_2 \cos \theta / 2m \quad (2)$$

In the above equation, $\lambda_{+1}$ is obtained by putting m=3–⅓, $\lambda_{-1}$ by putting m=3+⅓, and $\lambda_0$ by putting m=3 (though the values for $\lambda_{\pm 1}$ are approximate values).

When the grating pitch of the above diffraction grating 103 is set to p=180 $\mu$m, the distance on the optical axis between the grating and the light-receiving surface to l=45 mm, and the angle of incidence to $\theta_0$=30 degrees, the calculation with Eq. (1) yields the following.

$$Z\lambda_{+1} = 0.171 \text{ mm and } Z\lambda_{-1} = -0.136 \text{ mm.}$$

Namely, the 3-line sensor 4 may be produced so as to have such asymmetric line separations 116, 115 that the distance between the sensor lines of the monolithic 3-line sensor 104 is 0.171 mm on the + first-order light ($\lambda_{+1}$) side (R) (which is the distance 116 to the line 110) or 0.136 mm on the – first-order light ($\lambda_{-1}$) side (B) (which is the distance 115 to the line 108) from the center line 109 (G). This realizes a reasonable color reading apparatus not necessitating the redundant line memories for interpolation as described above.

However, the color image reading apparatus using this one-dimensional blazed diffraction grating as an optical element for color separation had the following problems.

The first problem is restrictions as to the peak wavelength, the wavelength width at half maximum, an overlapping amount of each color, etc. on the reading wavelength regions of the respective colors color-separated by the color-separating system. For example, assuming the wavelength characteristics shown in FIG. 8 are ideal wavelength characteristics of the reading system, angles of the ± first-order diffracted light relative to the zeroth-order diffracted light do not coincide with each other for any setting of the pitch of the one-dimensional blazed diffraction grating, because the peak wavelengths of the respective colors are not located in symmetry for any reference of color. Thus, there remains asymmetry. This asymmetry in different color light separations between the color light beams on the surface of the monolithic 3-line sensor.

It is thus necessary for the conventional apparatus to be constructed with an asymmetric arrangement of the sensor separations (line separations) in the sub-scanning direction, of the monolithic 3-line sensor, which causes a great difficulty in fabrication.

The second problem is a problem of chromatic aberration caused, for example, when the imaging optical system is comprised of a lens made of a glass material or the like, though this problem is not intrinsic to only image reading systems using the one-dimensional blazed diffraction grating.

The second problem results from dispersion characteristics of glass, and particularly, the fact that it is very difficult in the case of use of a lens made for example of a relatively cheap glass material to perfectly nullify the axial chromatic aberration occurring in the axial beam.

Therefore, the optical system has mutually different focused positions for the respective wavelengths of the color light beams color-separated by the one-dimensional blazed diffraction grating. In the conventional apparatus, the location of the monolithic 3-line sensor is generally adjusted along the direction of the depth of lens, so that the 3-line sensor is located at a best position on average, thus covering the above axial chromatic aberration.

However, such axial chromatic aberration decreases the depth obtained in common to the three colors, and increases difficulties in adjustment.

SUMMARY OF THE INVENTION

An object of the present invention is to provide a color image reading apparatus arranged in such a manner that for digitally reading a color image as color-separating an incident light beam into at least three colors using a monolithic 3-line sensor as light-receiving means and a one-dimensional blazed diffraction grating as color separating means, a dichroic mirror having at least two reflecting surfaces is provided in an optical path between the one-dimensional blazed diffraction grating and the monolithic 3-line sensor and the dichroic mirror reflects three light color beams color-separated by the one-dimensional blazed diffraction grating, whereby separations can be equal to each other between the three color light beams as color-separated in the sub-scanning direction on the surface of the monolithic 3-line sensor and whereby the apparatus can correct deviation between focused positions of the respective color light beams, caused by axial chromatic aberration of an imaging optical system.

The color image reading apparatus of the present invention is characterized in that a color image is focused by the imaging optical system through the color separating means comprised of the one-dimensional blazed diffraction grating for color-separating the incident light beam into the three color light beams, on the surface of the light-receiving means in which three line sensors are disposed on the same substrate surface; for reading the color image by the light-receiving means, the dichroic mirror in which the at least two reflecting surfaces are located a fine distance apart from each other in the thickness direction is disposed in the optical path between the one-dimensional blazed diffraction grating and the light-receiving means; the dichroic mirror reflects the three color light beams color-separated by the one-dimensional blazed diffraction grating; whereby the three color light beams color-separated in the sub-scanning direction become arranged at equal intervals on the surface of the light-receiving means.

The apparatus of the present invention is further characterized in that a direction of movement of focused position, caused by an optical pathlength difference appearing when at least one color light beam out of the three color light beams color-separated by the one-dimensional blazed diffraction grating is reflected by the reflecting surface a fine distance apart from the other in the thickness direction, is aligned with a direction to decrease deviation of focused position due to the axial chromatic aberration of the imaging optical system; in that reflection characteristics of the at least one reflecting surface forming the dichroic mirror include a characteristic to absorb the wavelengths in the infrared region; in that the reflection characteristics of the at least one reflecting surface forming the dichroic mirror include a characteristic to restrict the wavelength bands of spectral wavelength characteristics of the ± first-order diffracted light; or in that the one-dimensional blazed diffraction grating is a reflection type or transmission type diffraction grating.

BRIEF DESCRIPTION OF THE DRAWINGS

FIGS. 6A and 6B are a plan view (the main-scanning section) of major part and a side view (the sub-scanning section) of major part of the optical system in Embodiment 1 of the color image reading apparatus of the present invention;

DESCRIPTION OF THE PREFERRED EMBODIMENTS

Figure 6A:
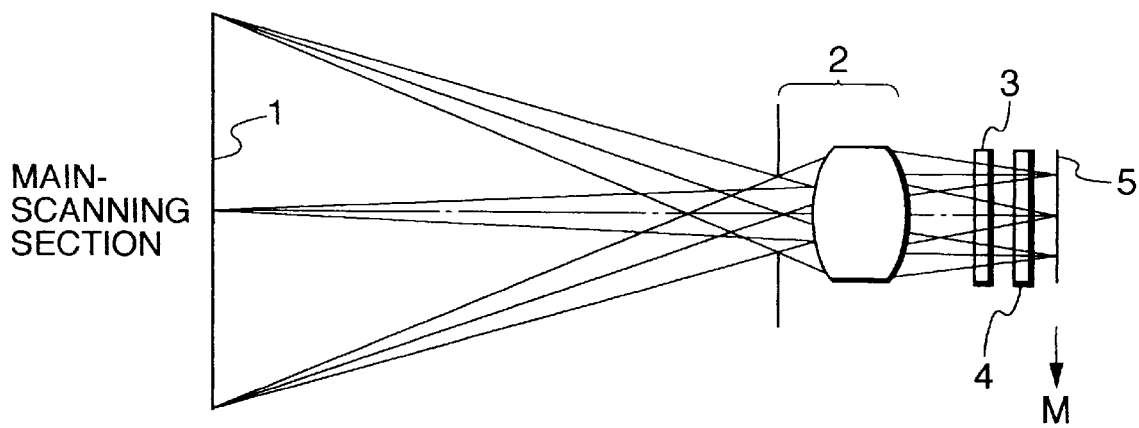
Figure 7:
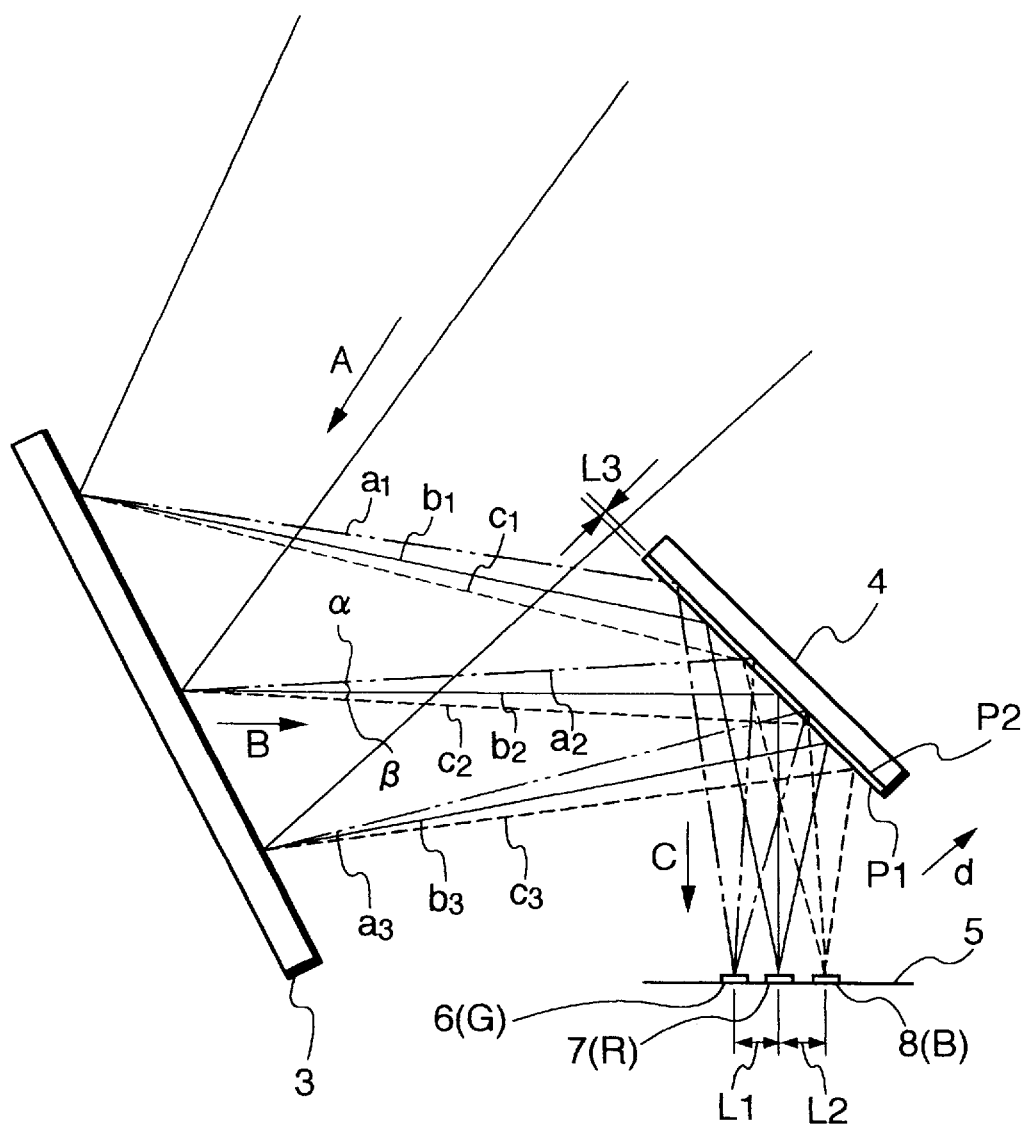
FIG. 7 is an enlarged explanatory drawing to show an enlarged view of a part of FIG. 6B.

FIGS. 6A and 6B are a plan view (the main-scanning section) of major part and a side view (the sub-scanning section) of major part of the optical system in Embodiment 1 of the color image reading apparatus of the present invention. FIG. 7 is an explanatory drawing to show an enlarged view of a part of FIG. 6B. The sub-scanning section is a cross section including the optical axis and being perpendicular to the main-scanning section.

In the drawings, reference numeral 1 denotes an original surface, which is an object on which a color image is formed. Numeral 2 denotes an imaging optical system, which focuses a light beam originating from the color image on the surface of the monolithic 3-line sensor 5 through the reflection type one-dimensional blazed diffraction grating 3 and dichroic mirror 4 as detailed below.

Numeral 3 designates a color separating means, which is comprised of a reflection type one-dimensional blazed diffraction grating (hereinafter also referred to simply as "diffraction grating") and which reflectively diffracts an incident light beam and separates it into predetermined color light beams, for example color light beams of the three primary colors, R (red), G (green), and B (blue), in the sub-scanning direction.

Figure 9:
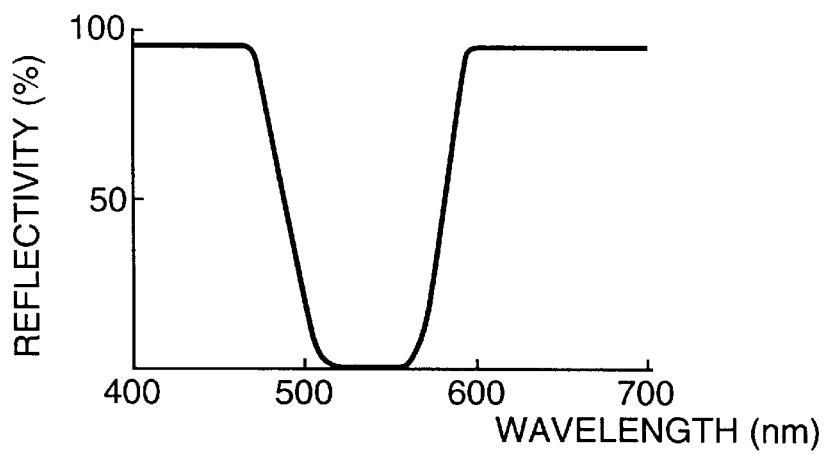
FIG. 9 is a characteristic chart to show the reflection characteristics of the first reflecting surface of the dichroic mirror.
Figure 10:
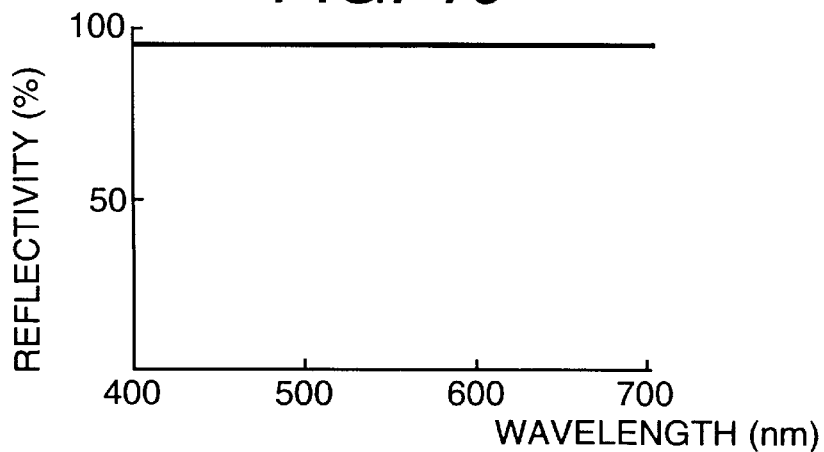
FIG. 10 is a characteristic chart to show the reflection characteristics of the second reflecting surface of the dichroic mirror.

Numeral 4 represents a dichroic mirror as a color separating means, which has at least two reflecting surfaces (dichroic reflecting surfaces) $P_1$, $P_2$. The two reflecting surfaces $P_1$, $P_2$ are formed at positions a fine distance apart from each other in the thickness direction d. In the present invention, a dichroic film for reflecting the blue light and red light is deposited by vapor deposition on the first reflecting surface $P_1$ out of the two reflecting surfaces $P_1$, $P_2$, and another dichroic film for reflecting the all color light (B, G, R) on the second reflecting surface $P_2$. This arrangement permits the present embodiment to selectively reflect arbitrary color light with desired wavelength characteristics. FIG. 9 and FIG. 10 are characteristic charts to show the reflection characteristics of the first and second reflecting surfaces $P_1$, $P_2$, respectively.

The present embodiment is so arranged that the two reflecting surfaces $P_1$, $P_2$ of the dichroic mirror 4 may reflect the three light color beams color-separated by the diffraction grating 3 whereby the three color light beams color-separated in the sub-scanning direction are arranged at equal intervals (sensor separations) on the surface of the monolithic 3-line sensor 5, as detailed later.

Numeral 5 is the light-receiving means, which is comprised of the monolithic 3-line sensor (hereinafter also referred to simply as "3-line sensor") in which three line sensors 6, 7, 8 each composed of a plurality of pixels aligned in a one-dimensional direction are disposed with the plurality of pixels being aligned in parallel with each other on a same substrate surface and in which separations $L_1$, $L_2$ in the sub-scanning direction between the line sensors 6, 7, 8 are equal to each other. Color filters (not shown) based on the respective color light beams are provided on the surfaces of the respective line sensors 6, 7, 8.

In the present embodiment the color image on the original surface 1 is line-scanned in the sub-scanning direction by a scanning means comprised of an unrepresented mirror etc. disposed between the original surface 1 and the imaging optical system 2. Then a beam of reflected light from the color image illuminated by an unrepresented illumination light source is condensed by the imaging optical system 2, and the light beam is color-separated into the three color light beams (B, G, R) by the reflection type one-dimensional blazed diffraction grating 3. After that, the color images thus separated are focused via the dichroic mirror 4 on the surfaces of the associated line sensors 6, 7, 8. The light-receiving means 5 digitally reads the color images based on the respective color light beams in order. The line sensors 6, 7, 8 extend in the main-scanning direction, which is the direction M in the drawing.

The reflection type one-dimensional blazed diffraction grating 3 for color separation in the present embodiment effects reflective diffraction on the light so as to separate the light subjected to reflective diffraction by the diffraction grating 3 into three directions of the − first-order light, the zeroth-order light, and the + first-order light and to focus the respective light beams at the predetermined positions on the surface of the light-receiving means 5.

The pitch of the diffraction grating 3 is set so as to effect reflective diffraction into the color light (light beams) having the wavelength characteristics to define the − first-order light for G (green), the zeroth-order light for R (red), and the + first-order light for B (blue) out of the light beams subjected to the reflective diffraction by the diffraction grating 3. When the light beams subjected to the reflective diffraction are classified for example into upper, principal, and lower rays, as shown in FIG. 7, the G (green) color light is represented by $a_1$, $a_2$, $a_3$, the R (red) color light by $b_1$, $b_2$, $b_3$, and the B (blue) color light by $c_1$, $c_2$, $c_3$.

Here, angles of diffraction of principal ray are $\alpha$ and $\beta$ for the − first-order diffracted light and the + first-order diffracted light, respectively, and the diffraction angle $\alpha$ is not coincident with the diffraction angle $\beta$ from the reason as described previously. In the present embodiment there is the relation of $\alpha > \beta$.

Figure 1:
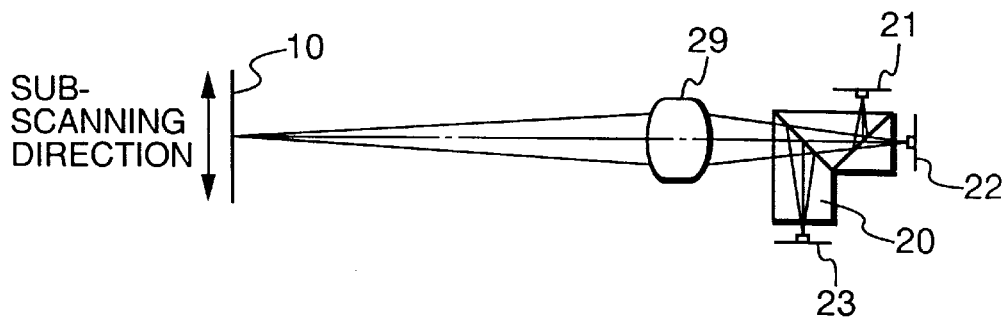
FIG. 1 is a schematic drawing to show the major part of the optical system in the conventional color image reading apparatus.
Figure 2:
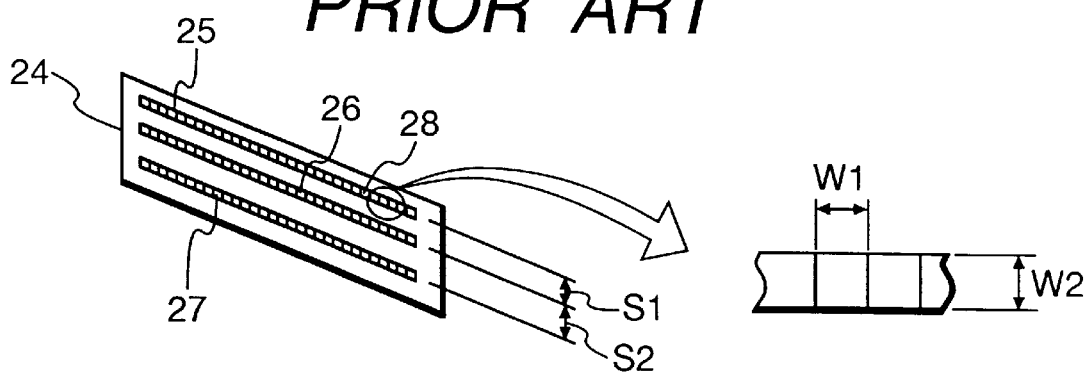
FIG. 2 is an explanatory drawing to illustrate the monolithic 3-line sensor.
Figure 3:
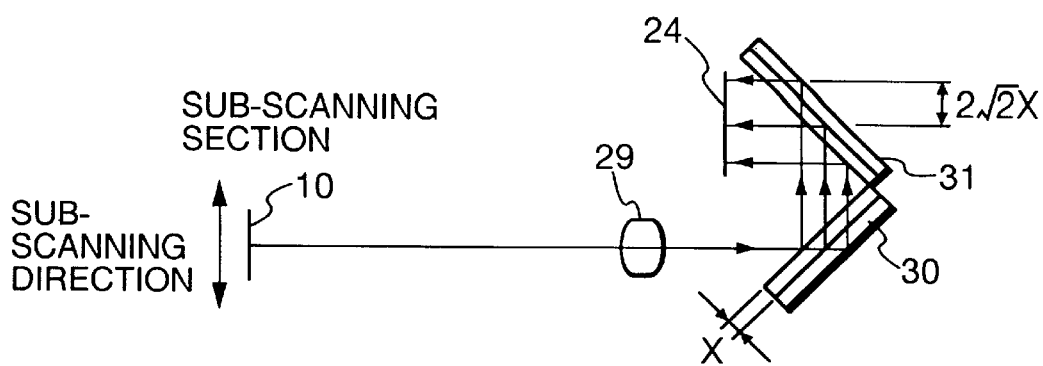
FIG. 3 is a schematic drawing to show the major part of the optical system in the conventional color image reading apparatus.
Figure 4:
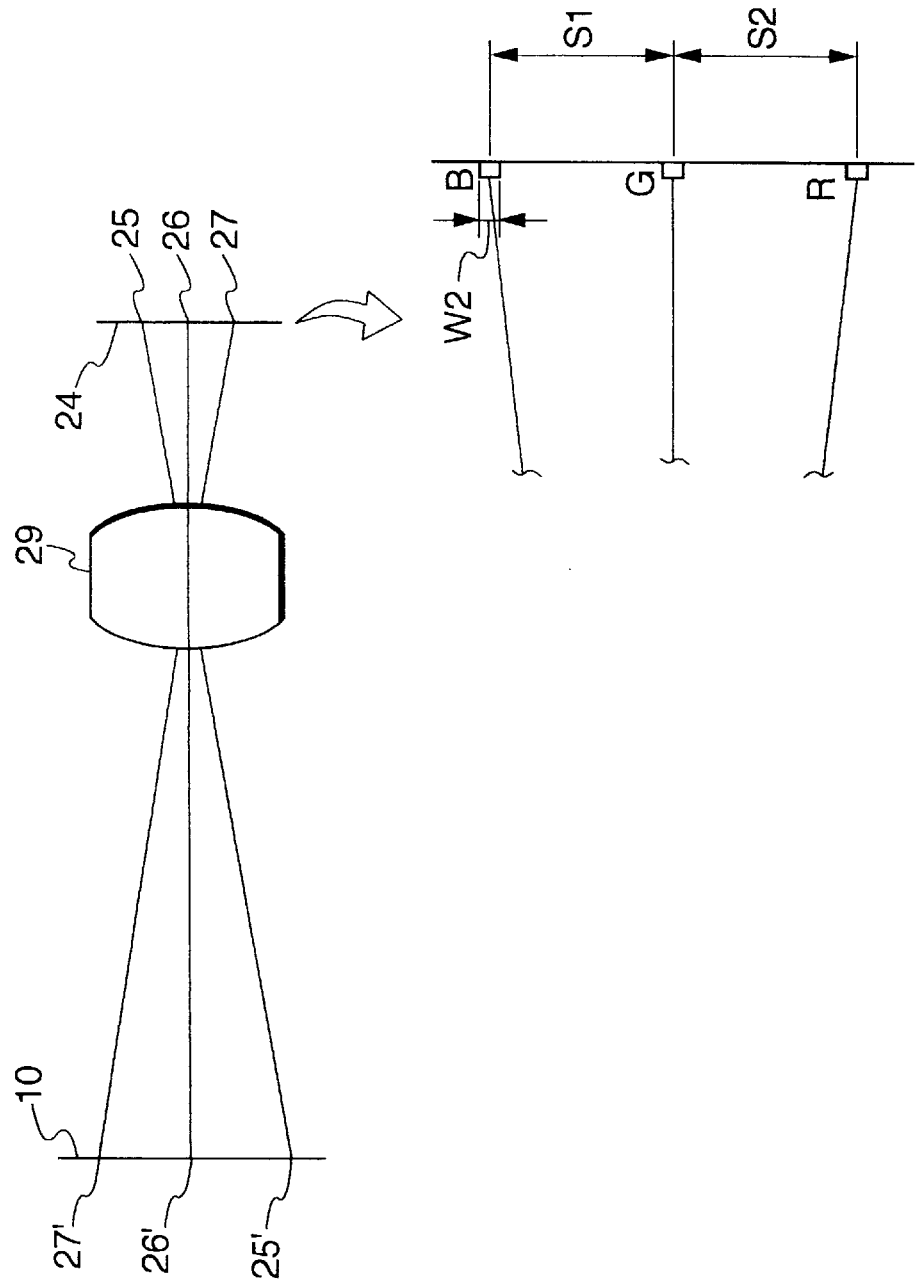
FIG. 4 is a schematic drawing to show the major part of the optical system in the conventional color image reading apparatus.
Figure 5A:
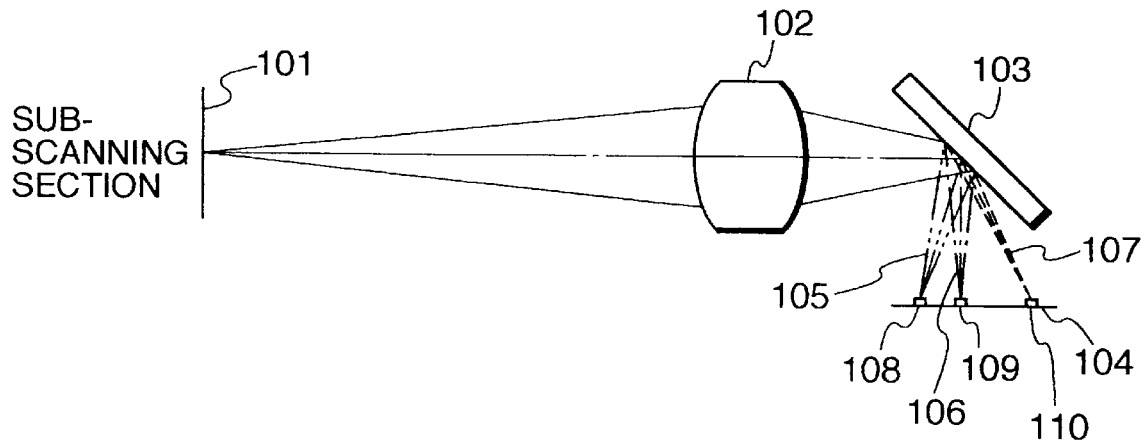
FIGS. 5A and 5B are schematic drawings to show the major part of the optical system in the conventional color image reading apparatus.
Figure 5B:
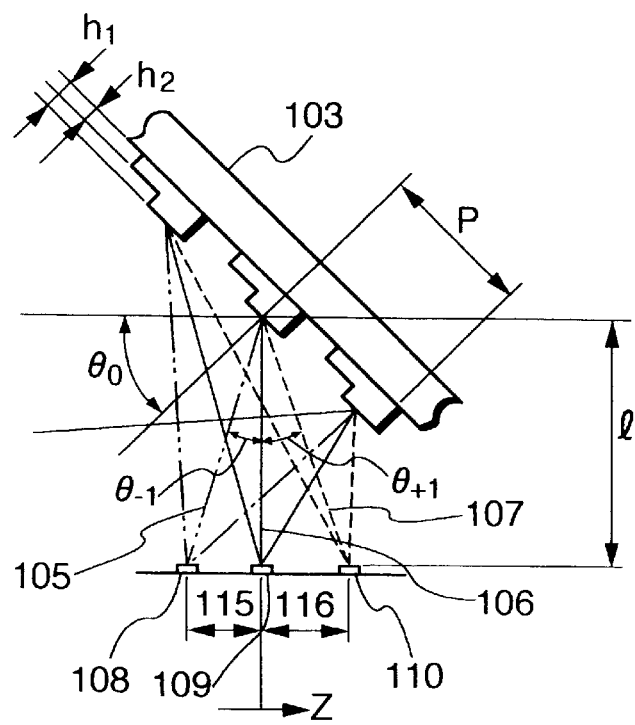

If the light-receiving means 5 should directly receive the light color-separated by the reflection type one-dimensional blazed diffraction grating 3 as described in above FIG. 5, no coincidence would be achieved similarly between the separations $L_1$ (the line separation between the green line sensor 6 and the red line sensor 7) and the separation $L_2$ (the line separation between the red line sensor 7 and the blue line sensor 8) between the line sensors 6, 7, 8 in the sub-scanning direction on the surface of the 3-line sensor 5, thus resulting in the relation of $L_1 > L_2$.

The present embodiment is thus arranged in such a manner that the dichroic mirror 4 as described above is disposed in the optical path between the diffraction grating 3 and the 3-line sensor 5 so as to make the sensor separations $L_1$, $L_2$ of the 3-line sensor 5 equal to each other and the dichroic mirror 4 is arranged to reflect the three color light beams color-separated by the diffraction grating 3, whereby the separations between the three color light beams color-separated in the sub-scanning direction become equal to each other on the surface of the 3-line sensor 5. The three color light beams are arranged to be incident at equal intervals on the predetermined surface, whereby the sensor separations $L_1$, $L_2$ of the 3-line sensor 5 are corrected so as to be equal to each other.

This correction method is next explained referring to FIG. 7.

Figure 8:
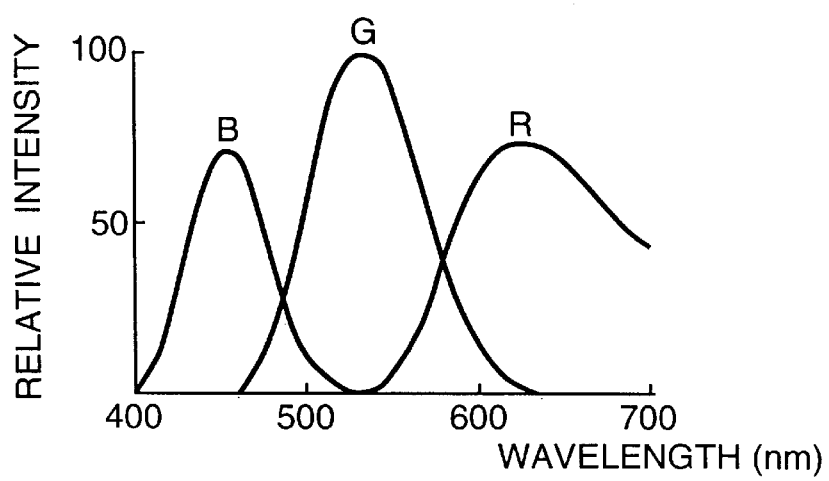
FIG. 8 is a characteristic chart to show wavelength characteristics of diffracted light after color separation by the one-dimensional blazed diffraction grating.

In the present embodiment, after being reflectively diffracted by the diffraction grating 3 in the direction of arrow B in the drawing, the color light beams are incident to the dichroic mirror 4. As described previously, the dichroic mirror 4 has the two reflecting surfaces, the first reflecting surface $P_1$ and second reflecting surface $P_2$, formed at positions a fine distance separated from each other in the thickness direction d. The color light beams reflectively diffracted by the diffraction grating 3 have the spectral wavelength characteristics as shown in FIG. 8.

Namely, the present embodiment is arranged so that out of the three color light beams color-separated by the diffraction grating 3, the first reflecting surface $P_1$ first may reflect the R color light and B color light so as to make the two light beams incident to the associated line sensors 7, 8 and that then the second reflecting surface $P_2$ may reflect the G color light so as to shift the incidence position (focused position) of the G color light incident onto the surface of the associated line sensor 6 toward the incidence position of the R color light because of the separation $L_3$ between the two reflecting surfaces $P_1$, $P_2$ the fine distance separated from each other. Properly setting the value of the separation $L_3$ between the two reflecting surfaces $P_1$, $P_2$, the sensor separations $L_1$, $L_2$ in the sub-scanning direction are made to be $L_1 = L_2$ on the surface of the 3-line sensor 5.

Figure 11:
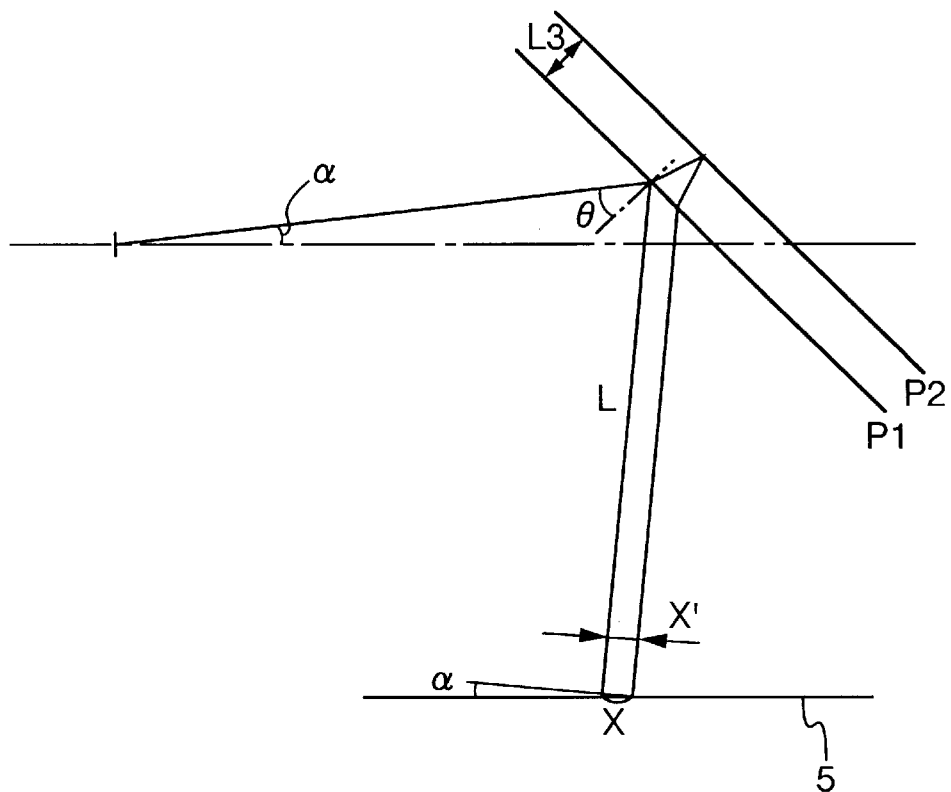
FIG. 11 is an explanatory drawing to show a relation between a shift amount and a separation between the first reflecting surface and the second reflecting surface.

FIG. 11 is an explanatory drawing to show a relation between the separation $L_3$ between the two reflecting surfaces $P_1$, $P_2$ of the dichroic mirror 4 and the shift amount x of color light on the surface of the 3-line sensor 5.

In the drawing, let $\alpha$ be an angle of diffraction of the principal ray from the diffraction grating 3, $\theta$ be an angle of incidence onto the dichroic mirror 4, $L_3$ be the separation between the first reflecting surface $P_1$ and the second reflecting surface $P_2$, L be a distance from a position where the diffracted light is incident on the first reflecting surface $P_1$ of the dichroic mirror 4 to the surface of the 3-line sensor 5, and x' be a separation between the color light beams reflected by the two reflecting surfaces $P_1$, $P_2$. Then the shift amount x of the color light on the surface of the 3-line sensor 4 can be obtained from the following equation.

$$x = 2L_3 \tan[\sin^{-1}\{(\sin\theta)/n_1\}] = (\cos\theta)/(\cos\alpha)$$

In the equation, $n_1$ represents a refractive index of a glass material forming the separation $L_3$ between the two reflecting surfaces $P_1$, $P_2$. The relation between shift amount x and separation $L_3$ becomes definite by determining the values of $\theta$, $\alpha$, $n_1$ from the above relation, and the shift amount x of the color light can be freely set by properly determining the separation $L_3$. This is utilized to make the separations (sensor separations) between the three color light beams color-separated in the sub-scanning direction equal to each other on the surface of the monolithic 3-line sensor 5.

On the other hand, when the G color light is reflected by the second reflecting surface $P_2$ in order to shift the incidence position thereof to the line sensor, the optical pathlength of the G color light becomes a fine amount longer than when it is reflected by the first reflecting surface $P_1$. An elongation amount $\Delta L$ of the optical pathlength in this case is expressed by the following equation.

$$\Delta L = \{L_3/[\cos\{\sin^{-1}((\sin\theta)/n_1)\}] \} \times 2/n_1 + x \cdot \sin\alpha - 2L_3 \tan[\sin^{-1}\{(\sin\theta)/n_1\}] \cdot \sin\theta$$

For example, supposing $n_1=1.51$, $\theta=44.69$, $\alpha=0.312$, and $x=40$ μm, the separation $L_3$ between the two reflecting surfaces $P_1$, $P_2$ and the elongation amount $\Delta L$ of the optical pathlength become as follows.

$L_3 = 53.5$ μm $\Delta L = 40.9$ μm

In the present embodiment, correction is made by making the direction of movement of the focused position due to the optical pathlength difference (elongation amount) $\Delta L$ of the G color light occurring in shifting the incidence position of the G color light to the line sensor coincident with the direction to decrease the deviation of the focused position of the G color light due to the axial chromatic aberration of the lens used as the imaging optical system.

Namely, the present embodiment is arranged to effectively correct the deviation by setting the focus movement, occurring in shifting the incidence position of the G color light incident to the surface of the line sensor 6 toward the incidence position of the R color light, in such a direction that the axial chromatic aberration for the G color light in the imaging optical system may become minus. This increases the depth obtained in common in the wavelength regions of the respective color light beams color-separated by the diffraction grating.

Next explained is Embodiment 2 of the present invention.

Embodiment 1 as described above was so arranged that the incidence position of the G color light is so corrected as to approach the incidence position of the R color light in order to equalize the sensor separations $L_1$, $L_2$ in the sub-scanning direction between the line sensors 6, 7, 8 on the surface of the 3-line sensor 5, whereas the present embodiment achieves the same effect as Embodiment 1 described above inversely by such correction as to shift the incidence position of the B color light away from the incidence position of the R color light in order to achieve the relation of $L_1=L_2$.

Figure 12:
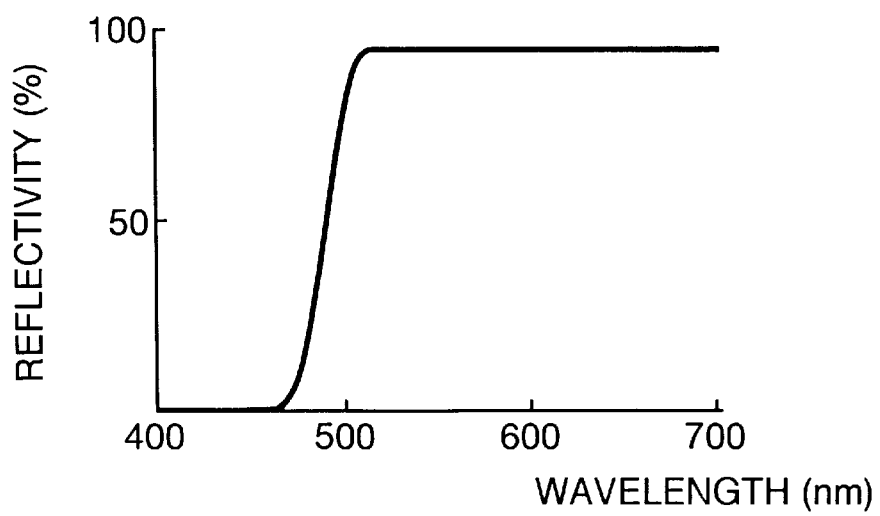
FIG. 12 is a characteristic chart to show the reflection characteristics of the first reflecting surface of the dichroic mirror in Embodiment 2 of the present invention.
Figure 13:
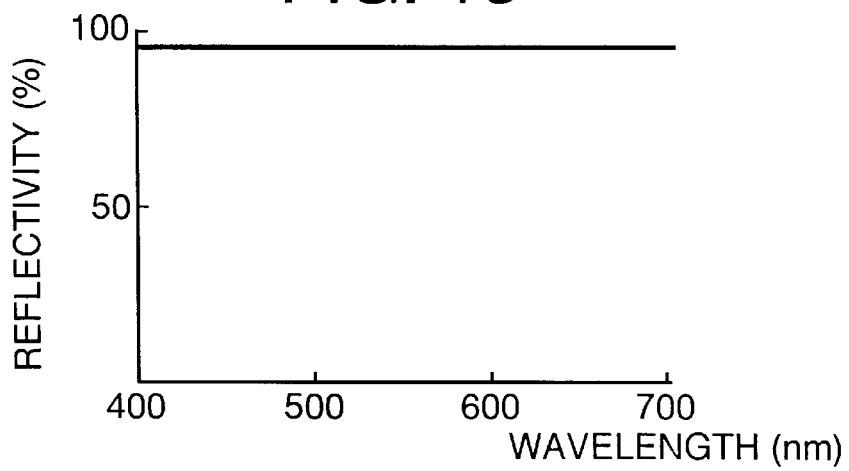
FIG. 13 is a characteristic chart to show the reflection characteristics of the second reflecting surface of the dichroic mirror in Embodiment 2 of the present invention.

Namely, Embodiment 2 is so arranged that the dichroic mirror 4 has the two reflecting surfaces $P_1$, $P_2$, which are dichroic mirror reflecting surfaces having the reflection characteristics as shown in FIG. 12 and FIG. 13, respectively, that the first reflecting surface $P_1$ of the dichroic mirror 4 reflects the G color light and R color light so as to make the G color light and R color light incident onto the surfaces of the associated line sensors 6, 7, and that then the second reflecting surface $P_2$ reflects the B color light so as to shift the incidence position (focused position) thereof incident to the surface of the associated line sensor 8 in the opposite direction to the incidence position of the R color light by the separation $L_3$ between the two reflecting surfaces $P_1$, $P_2$ the fine distance separated from each other. The sensor separations $L_1$, $L_2$ in the sub-scanning direction on the surface of the 3-line sensor 5 are adjusted to be $L_1=L_2$ by properly setting the value of separation $L_3$ between the two reflecting surfaces $P_1$, $P_2$.

Further, correction is made by making the direction of movement of focused position due to the optical pathlength difference $\Delta L$ of the B color light occurring in shifting the incidence position of the light beam (B color light) coincident with the direction to decrease the deviation of focused position of the B color light due to the axial chromatic aberration of the lens used as the imaging optical system.

Next explained is Embodiment 3 of the present invention.

Most line sensors using a silicon material etc. are generally sensitive to the infrared region, and thus, for example if a halogen lamp or the like is used as the light source in the reading system, it becomes necessary to cut light beams having the spectral characteristics in the infrared region.

Figure 14:
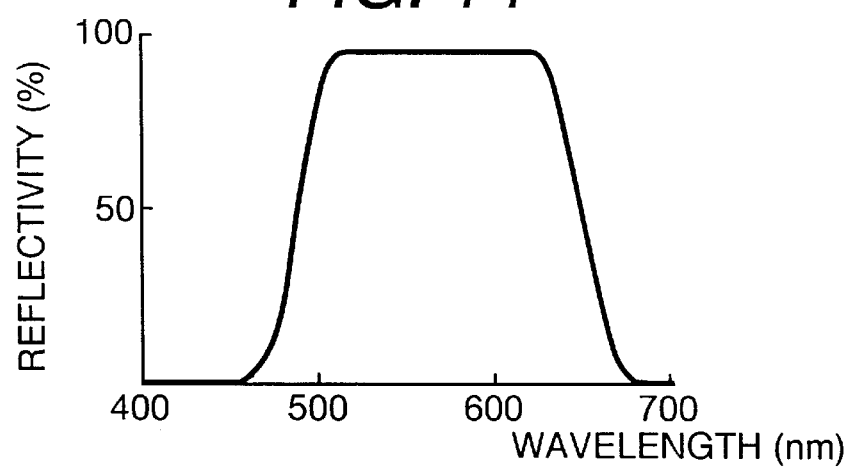
FIG. 14 is a characteristic chart to show the reflection characteristics of the first reflecting surface of the dichroic mirror in Embodiment 3 of the present invention.

Therefore, Embodiment 3 is arranged to arbitrarily cut light beams in the infrared region by changing the reflection characteristics of the first reflecting surface $P_1$ (see FIG. 12) in Embodiment 2 described above into the reflection characteristics to absorb the infrared region as shown in FIG. 14. This can cut the infrared light without using a separate infrared cut filter, thereby compactifying the entire apparatus.

The first reflecting surface $P_1$ has the reflection characteristics to absorb the infrared region in Embodiment 3, but instead thereof, the second reflecting surface $P_2$ may be arranged to have such reflection characteristics, of course. It is also noted that the technique of the present embodiment may be applied to Embodiment 1 described above as enjoying the same effect as in the present embodiment.

Next explained is Embodiment 4 of the present invention.

When the reflection type blazed diffraction grating is used as the color separating means to color-separate a light beam into desired spectral characteristics, a difference between diffraction angles due to a difference between the wavelengths of the incident light beams causes a phenomenon of making color images of the ± first-order diffracted light out of focus in the sub-scanning direction.

Figure 15:
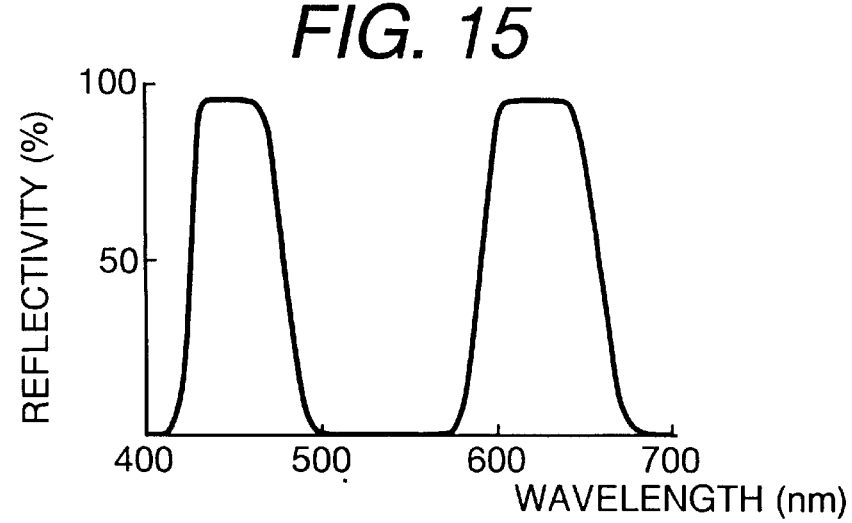
FIG. 15 is a characteristic chart to show the reflection characteristics of the first reflecting surface of the dichroic mirror in Embodiment 4 of the present invention.

Therefore, Embodiment 4 is arranged to relax the out-of-focus in the sub-scanning direction occurring due to the difference between the wavelengths of the incident light beams by modifying the reflection characteristics of the first reflecting surface $P_1$ (see FIG. 9) of the dichroic mirror 4 shown in Embodiment 1 described previously so as to limit spectral wavelength bands of the ± first-order diffracted light within the permissible ranges as shown in FIG. 15, that is, by narrowing the wavelength bands of the B color light and R color light. This permits high-accuracy reading of color image with the three color light beams of R, G, B.

Next explained is Embodiment 5 of the present invention.

Embodiments 1 to 4 described above showed the cases where the reflection type blazed diffraction grating was used as the color separating means to obtain the color light beams with desired spectral characteristics, but the present invention can be applied to the cases where a transmission type blazed diffraction grating replaces the reflection type blazed diffraction grating, similarly as to the each embodiment as described above, whereby the same effect can be attained.

According to the invention, the color image reading apparatus using the one-dimensional blazed diffraction grating as the color separating means is arranged to reflect the three color light beams, color-separated by the diffraction grating, by the dichroic mirror in which the at least two reflecting surfaces are formed at the positions the fine distance apart from each other in the thickness direction, so that the separations between the three color light beams color-separated in the sub-scanning direction can be made equal to each other on the surface of the monolithic 3-line sensor as the light-receiving means, thereby achieving the color image reading apparatus that can read the color image at high accuracy by the monolithic 3-line sensor in simple structure.

According to the invention, the apparatus is arranged to make the direction of movement of focused position occurring when the at least one color light beam out of the three color light beams color-separated by the one-dimensional blazed diffraction grating is reflected by the second reflecting surface different from the first reflecting surface for reflecting the other color light beams in the dichroic mirror, coincident with the direction to decrease the deviation of the focused position due to the axial chromatic aberration, thereby achieving the color image reading apparatus that can increase the depth obtained in common in the wavelength regions of the respective color light beams color-separated.

According to the invention, the reflection characteristics of the at least one reflecting surface forming the dichroic mirror are arranged to include the characteristic to absorb the wavelengths in the infrared region, thereby achieving the color image reading apparatus that can cut the wavelengths in the infrared region without using an infrared cut filter normally used as a separate member.

According to the invention, the reflection characteristics of the at least one reflecting surface forming the dichroic mirror are set to the characteristics to limit the wavelength bands of the spectral wavelength characteristics of the ± first-order diffracted light, thereby achieving the color image reading apparatus that can decrease out-of-focus in the sub-scanning direction occurring from the difference between the diffraction angles due to the difference between the wavelengths of the incident light beams.

According to the invention, the reflection type or transmission type one-dimensional blazed diffraction grating can be used as the color separating means, thus achieving the color image reading apparatus attaining the above effects.

What is claimed is:

1. A color image reading apparatus comprising:

light-receiving means in which a plurality of line sensors are disposed at equal intervals on a single substrate;

an imaging optical system for imaging an object on said light-receiving means;

a blazed diffraction grating, disposed in an optical path between said imaging optical system and said light-receiving means, for color-separating light from the object into at least three color light beams; and a dichroic mirror disposed in an optical path between said blazed diffraction grating and said light-receiving means, and having at least two reflecting surfaces, wherein said dichroic mirror corrects the intervals of said at least three color light beams on said light-receiving means by reflecting said at least three color light beams color-separated by said blazed diffraction grating.

2. The color image reading apparatus according to claim 1, wherein said dichroic mirror has a first reflecting surface and a second reflecting surface and wherein said second reflecting surface reflects at least one color light beam out of the plurality of color light beams color-separated by said blazed diffraction grating and said first reflecting surface different from said second reflecting surface reflects the other color light beams.

3. The color image reading apparatus according to claim 2, wherein said at least one color light beam has a difference of an optical pathlength different from that of said other color light beams by being reflected by said second reflecting surface and wherein a direction of movement of a focused position of said at least one color light beam, caused by said difference of the optical pathlength, is coincident with a direction to decrease deviation of the focused position of said at least one color light beam due to axial chromatic aberration of said imaging optical system.

4. The color image reading apparatus according to claim 1, wherein reflection characteristics of at least one reflecting surface forming said dichroic mirror comprise a characteristic to absorb wavelengths in the infrared region.

5. The color image reading apparatus according to claim 1, wherein reflection characteristics of at least one reflecting surface forming said dichroic mirror comprise a characteristic to limit spectral wavelength characteristics of ± first-order diffracted light from said blazed diffraction grating.

6. The color image reading apparatus according to claim 1, wherein said blazed diffraction grating is a reflection type or transmission type diffraction grating.

7. The color image reading apparatus according to claim 1, wherein said blazed diffraction grating color-separates the light from object into a plurality of color light beams in a sub-scanning direction and said light-receiving means is arranged with the plurality of line sensors being located at equal intervals in said sub-scanning direction.

8. The color image reading apparatus according to claim 1, wherein said at least two reflecting surfaces are formed at positions a fine distance separated from each other in a direction of the thickness of said dichroic mirror.

9. The color image reading apparatus according to claim 1, wherein said blazed diffraction grating is a one-dimensional blazed diffraction grating.

* * * * *

UNITED STATES PATENT AND TRADEMARK OFFICE
CERTIFICATE OF CORRECTION

PATENT NO. : 5,844,233

DATED : December 1, 1998

INVENTOR(S) : HIROSHI SATO

Page 1 of 2

It is certified that error appears in the above-identified patent and that said Letters Patent is hereby corrected as shown below:

ON THE TITLE PAGE [56] References Cited

U.S. PATENT DOCUMENTS, insert
--4,991,030 2/1991 Sato et al.
5,223,703 6/1993 Setani--; and
OTHER PUBLICATIONS, insert
--OTHER PUBLICATIONS
H. Dammann, "Color Separation Gratings," APPLIED OPTICS, Vol. 17, No. 15, pp. 2273-2279, 1 August 1978.--

COLUMN 2

Line 35, "read" should read --being read--.

COLUMN 8

Line 2, "$C_3$." should read --$c_3$.--.

UNITED STATES PATENT AND TRADEMARK OFFICE
CERTIFICATE OF CORRECTION

PATENT NO. : 5,844,233
DATED : December 1, 1998
INVENTOR(S) : HIROSHI SATO

It is certified that error appears in the above-identified patent and that said Letters Patent is hereby corrected as shown below:

COLUMN 11

Line 5, "the" should be deleted.

Signed and Sealed this

Fourth Day of April, 2000

Attest:

Q. TODD DICKINSON

Attesting Officer

Director of Patents and Trademarks